3,116,119
CARBON BLACK PLANT CONTROL
Carl L. Osburn and Donald A. Marsh, both of Bartlesville, Okla., assignors to Phillips Petroleum Company, a corporation of Delaware
Filed July 11, 1961, Ser. No. 123,196
11 Claims. (Cl. 23—259.5)

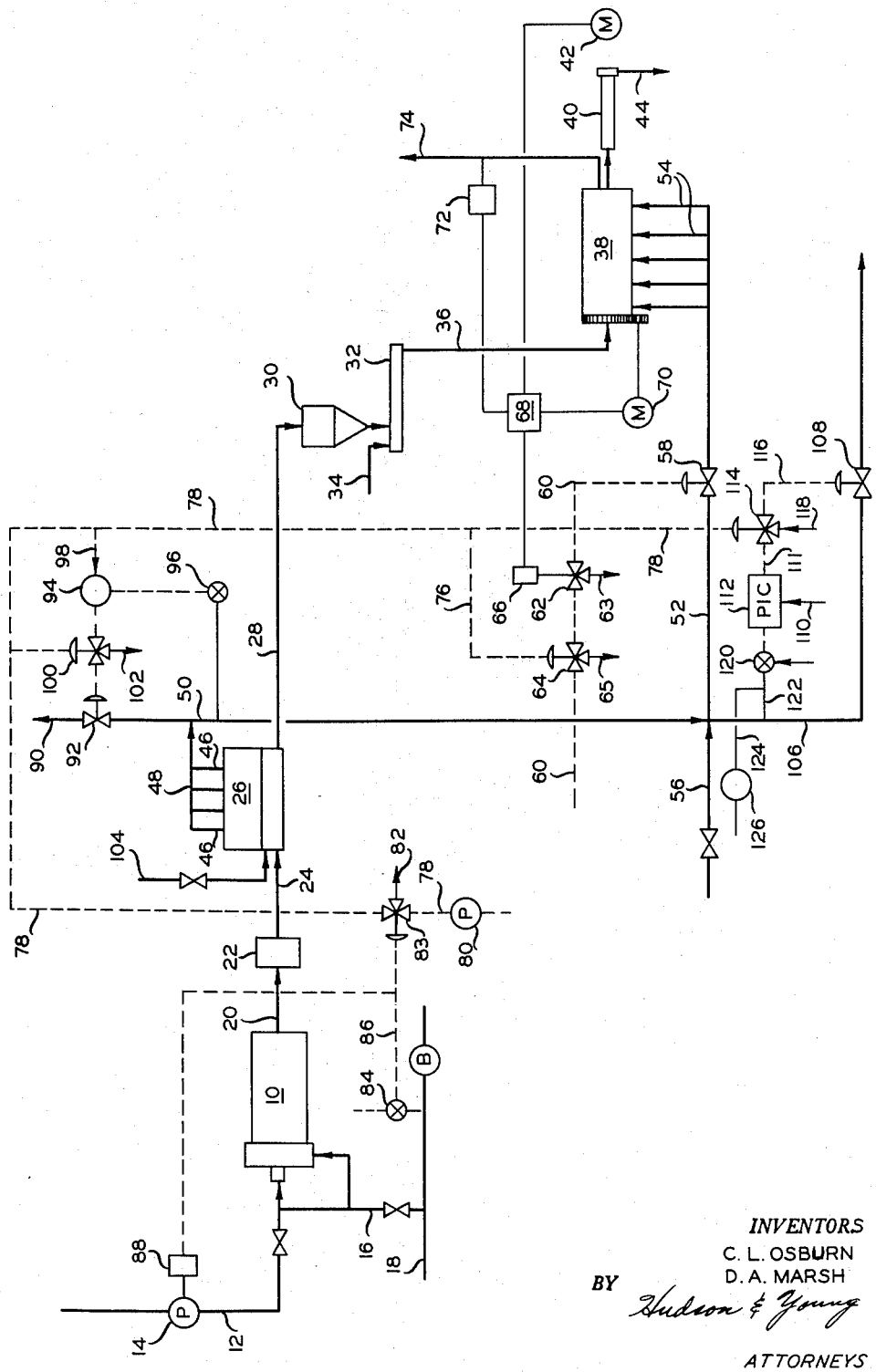

This operation relates to carbon black plant control and operation. A specific aspect of the invention relates to apparatus for utilizing off-gas from carbon black production as fuel in heating and drying wet pellets formed in the plant.

In the production of carbon black from oil, by burning the oil with air in a carbon black furnace or reactor under conditions of incomplete combustion the reactor effluent, after separation of carbon black therefrom, has a B.t.u. content that is too low to support combustion in most applications. However, in locations where gas and oil are relatively costly, it is profitable to utilize this off-gas for fuel. This invention is concerned with the use of off-gas as fuel for the drying of wet pellets in a carbon black plant and with an arrangement of apparatus and controls which facilitates this use in the plant.

Accordingly, it is an object of the invention to provide apparatus and controls for utilizing off-gas as fuel for pellet drying in a carbon black plant in which the black is wet pelleted. Another object is to provide safety controls for operation of a rotary drum type pellet dryer in a carbon black plant. It is also an object of the invention to provide an arrangement of apparatus and controls for use in starting up the pellet dryer after shut-down for any cause. Other objects will become apparent to one skilled in the art upon consideration of the accompanying disclosure.

A broad aspect of the invention utilizes a fuel line leading from the off-gas line of the bag filter to the burners on the pellet dryer, an air operated motor valve in the fuel line, a first air supply line operatively connected with the motor valve, a solenoid operated first 3-way valve in the first air supply line, an air operated second 3-way valve in said first air supply line upstream of said first 3-way valve, said solenoid operated 3-way valve being operatively connected in circuit with at least one of the motor operating the rotary dryer, the motor operating the conveyor leading from the dryer, a transmitter sensitive to the temperature in the dryer off-gas, said air operated second 3-way valve being operatively connected to the instrument air system of the plant, whereby failure of the dryer motor, conveyor motor, and/or maintenance of temperatures below a predetermined maximum in the dryer, or shutdown of the plant apparatus and bleeding off of the instrument air pressure which connects with the control instruments in the plant, shuts off the motor valve in the fuel line.

Another aspect of the invention comprises an arrangement of apparatus and controls for purging the bag filter and fuel line downstream thereof after shut-down of the plant and before starting up same. This system purges with steam the bag filter and gaseous effluent line leading therefrom to the fuel line of the dryer while avoiding leakage of air into the system during the purging, which might result from low pressure caused by steam condensation. The system comprises a vent line having an air operated motor valve therein, an air supply line operatively connected to the motor valve, an air operated 3-way valve in said air supply line, a second air supply line connected with the third port of said 3-way valve, a pressure controller in said second air supply line, a pressure sensing device sensitive to the pressure in said vent line upstream of the motor valve therein and in operative control of the pressure controller so that when instrument air pressure in the plant system is bled off, said 3-way valve is operated to connect the second air supply line thru said pressure controller and said 3-way valve with the actuating mechanism of said air-operated motor valve. The pressure sensing device, which may be a pressure transmitter, feeds a signal to the pressure controller which controls the flow of air to the motor valve in the vent line and pinches down on this valve when the pressure in the vent line drops below a predetermined minimum, such as about 2 p.s.i.

A more complete understanding of the invention may be had by reference to the accompanying schematic drawing which illustrates an arrangement of apparatus and flow in a carbon black plant, according to the invention.

Referring to the drawing, a carbon black reactor 10 is provided with an oil feed line 12 in which is positioned a pump 14, an air-supply line 16 for both axial and tangential air which connects with an air header 18, and an effluent smoke line 20 leading into a quench tower 22 from which the quenched effluent passes thru line 24 to a carbon black collecting system including bag filter 26. Carbon black separated from gas fed to filter 26 is recovered and passed thru conveyor 28 to surge vessel 30 from which it passes to wet pelletizers 32. Water is fed to the pelletizer thru line 34 and said pellets are conveyed thru line 36 to rotary drum dryer 38. The delivery end of dryer 38 connects with conveyor 40 which is operated by motor 42. The dried pellets are delivered thru line 44 to bagging apparatus or to storage.

Off-gas from filter 26 passes thru lines 46 to manifold line 48 which connects with line 50. Fuel supply line 52 connects with line 50 and with burners (not shown) within rotary dryer 38 thru lines 54. An oil line 56 connects with fuel line 52 for injecting oil or hydrocarbon gas into the off-gas fed into the fuel line to enrich the same and render it readily combustible in the dryer burners with ordinary air.

The fuel control system comprises first air-operated motor valve 58 in line 52, a first air supply line 60, a solenoid operated first 3-way valve 62, and an air operated second 3-way valve 64 positioned in line 60. The solenoid 66 of valve 62 is connected thru a relay system 68 with motor 70 which drives rotary dryer 38, with motor 42 on a conveyor 40, and with transmitter 72 which is sensitive to temperature in off-gas line 74 from dryer 38.

Air operated valve 64 is operatively connected with air supply line 76 which is tied into instrument air line 78, supplying instrument air to the control instruments of the plant. Instrument air for plant control is supplied by blower 80 which forces air into line 78. A 3-way motor valve 83 bleeds pressure off thru vent line 82 when conditions in the plant indicate shut-down. Valve 83 may be operated in various ways such as by pressure transmitter 84 which is sensitive to pressure in header 18, supplying air to the various reactors in the plant and cuts off air pressure in line 86 leading to the top of valve 83 to open same to vent 82 when a minimum pressure is reached in air header 18. Valve 83 is operated in the same manner by transmitter 88 when pump 14 ceases to operate and supply oil to the reactors.

Bag filter 26 is preferably operated at high enough pressure to eliminate the need for a blower in line 46 or in line 50, although a blower may be utilized in one of said lines to maintain adequate pressure for feeding the burners of the dryer 38. In order to prevent excessive pressure in line 50 a vent line 90 is provided with an air-operated motor valve 92 therein. The pressure in line 50 is held below a predetermined maximum by pressure recording controller 94 operating from transmitter 96 which is sensitive to pressure in line 50 and sends a signal to controller 94 when the pressure reaches said maximum.

Controller 94 increases the pressure on the diaphragm in valve 92 by feeding air from line 98 thru motor valve 100. Motor valve 100 is maintained open to flow of instrument air during normal operation when pressure is maintained in the instrument air lines, and vents thru line 102 when instrument air pressure is bled off from line 78. When air is vented from the diaphragm of valve 92 thru line 102 during shut-down, motor valve 92 is closed.

After shut-down of the plant for any reason, it is essential to purge the filter 26 and the off-gas and fuel line downstream thereof to prevent possible explosion upon start-up. For this purpose, steam line 104 connects with the up-stream end of filter 26 and a vent line 106 just upstream of valve 58 in fuel line 52 is provided. Air operated motor valve 108 in line 106 is operated by instrument air fed from line 110 thru pressure indicating controller 112 and thru air-operated 3-way valve 114 thru line 116. During normal operation when instrument air is applied to the diaphragm of valve 114 this valve is open from air line 118 to line 116 so as to maintain pressure on motor valve 108 and keep same closed. During shut-down and bleeding off of pressure from line 78, valve 114 is opened to air in line 110 and line 116 which is controlled by instrument 112. This instrument (pressure controller 112) is controlled by pressure transmitter 120 which is sensitive to pressure in line 106 thru connecting line 122. Instrument 120 sends a signal to controller 112 which is proportional to the pressure in line 106. Controller 112 is set to operate when a pressure below a minimum predetermined value in line 106 occurs. This instrument is set to operate when the pressure in line 106 drops below a low pressure, such as two inches of water, thereby passing air from line 110 thru valve 114 and line 116 to put pressure on the diaphragm of 108 and close same so that air cannot enter line 106 during purging, in case steam condensation drops the pressure in line 106 below atmospheric. Line 124 connects with a gas source (not shown) and with line 122 and is provided with a slow rate flow controller 126 which allows manufactured gas to slowly bleed thru line 122 into line 106 and prevent carbon deposition therein and plugging thereof, thereby assuring the proper action of pressure transmitter 120.

The control system shuts motor valve 58 in the event failure occurs around rotary dryer 38, such as failure of motor 70, motor 42, or excessive temperature in the dryer as measured in line 74. A relay system 68 sensitive to the motor circuits and to transmitter 72 maintains solenoid 66 energized to hold valve 62 open thru line 60. When failure occurs, solenoid 66 is de-energized by cutting off current thereto and 3-way valve 62 is then opened from line 60 downstream thereof thru vent 63. This takes the pressure off the diaphragm in motor valve 58 to allow same to close. In a similar manner when plant shut-down occurs or when instrument air pressure is bled off line 76, the diaphragm of 3-way valve 64 is operated to open line 60 intermediate valves 62 and 64 to vent line 65. This takes pressure off line 60 downstream of valves 62 and 64 so as to close valve 58.

During the purging of the filter 26 with steam, instrument pressure in line 78 has been bled off so that valve 114 is reversed and open to flow thru line 110. This takes the pressure off the diaphragm of valve 108 so as to open same and put the system in control of pressure controller 112 which is sensitive and actuated by pressure transmitter 120 when the pressure in line 106 falls below a selected minimum, such as two inches of water. This prevents back flow of air into the system thru line 106 which might be caused by condensation of steam in the lines.

Certain modifications of the invention will become apparent to those skilled in the art and the illustrative details disclosed are not to be construed as imposing unnecessary limitations on the invention.

We claim:

1. Apparatus comprising in combination a rotatable gas fired dryer having burner means therein; a fuel line connected with said burner means; a normally closed air operated motor valve in said fuel line; a first air supply line connected with said motor valve; a solenoid operated first three-way valve in said first air supply line open to flow thru said air line when the solenoid is energized and open to vent from the downstream side when not energized; an electric motor mechanically connected with said rotatable dryer for operating same; and relay means in circuit with said solenoid and actuated by the circuit of said motor so as to de-energize said solenoid when said motor stops, thereby opening said first three-way valve to vent to bleed off pressure on said motor valve and allow same to cut off fuel to said burner means.

2. Apparatus comprising in combination a rotatable gas fired dryer having burner means therein; a fuel line connected with said burner means; a normally closed air operated motor valve in said fuel line; an air supply line connected with said motor valve; a solenoid operated three-way valve in said air supply line open to flow thru said air line when the solenoid is energized and open to vent from the downstream side when not energized; a first motor operatively connected to rotate said dryer; a stack leading from said dryer having temperature sensing means therein; a conveyor connected with the solids outlet of said dryer having a second motor operatively connected therewith; electrical means sensitive to current passing thru said first and second motors and to said temperature sensing means and in control of said solenoid for operating same to open said 3-way valve to vent when malfunctioning of the dryer occurs as indicated by any one of three conditions, viz., failure of said first motor, failure of said second motor, and excessive temperature sensed by said temperature sensing means.

3. The apparatus of claim 2 in a carbon black plant having air operated control instruments and an instrument air supply system therefor; an air operated three-way valve in said first air supply line upstream of said first three-way valve open to flow thru said first air supply line when air actuated and open to vent from the downstream side of said supply line when actuating air is not applied; said second three-way valve being connected by an air line with said instrument air system so that pressure failure in said supply system operates said second three-way valve to open same to vent and bleed off pressure from said first instrument air line downstream of said second three-way valve thru said first three-way valve to allow said motor valve to close, thereby cutting off the fuel to said dryer.

4. The apparatus of claim 2 in a carbon black plant comprising a carbon black furnace, a bag filter in the effluent line from said furnace, and an off-gas line from said filter connected with said fuel line upstream of said motor valve for supplying fuel gas to said dryer.

5. The apparatus of claim 4 including an oil line leading into said fuel line upstream of said motor valve for injecting oil into said off-gas to enrich same.

6. The apparatus of claim 4 including air operated control instruments in said plant and an instrument air supply system therefor, a purge line leading into the inlet side of said bag filter for purging same with inert gas, such as steam, whereby said inert gas vents thru said off-gas line and said fuel line; a vent line connected with said fuel line upstream of the motor valve in said fuel line; a second normally closed air operated motor valve in said vent line; a third air supply line actuatably connected with said second motor valve; an air operated third three-way valve in said third air supply line normally open to flow thru said air supply line and closed, when operating air pressure from said supply system is bled off connected with said third three-way valve; a pressure controller in said fourth air supply line; and a pressure transmitter sensitive to pressure in said vent line upstream of said second motor valve and operatively connected with said pressure controller, said pressure transmitter being set to actuate said pressure controller when pressure in said vent line falls below a predetermined low minimum pressure to pass air thru said third three-way from said fourth air supply line to said second motor valve to close same until said minimum pressure is restored.

7. A carbon black plant comprising in combination reactor means for producing carbon black from hydrocarbon fuel; an air feed line and a fuel feed line leading to said reactor means; an effluent smoke line leading from said reactor means; recovery means in said effluent smoke line for recovering carbon black; an effluent off-gas line leading from said recovery means; an effluent carbon black line leading from said recovery means; wet pelleting means at the downstream end of said effluent carbon black line; an effluent wet pellet line leading from said wet pelleting means; pellet heating and drying means at the downstream end of said effluent pellet line including a rotatable drum and fuel gas burner means therein; a fuel supply line leading from said off-gas line to said burner means; a motor valve in said fuel supply line; an oil line connected with said fuel supply line upstream of said motor valve; separate air operated instrument means responsive to pressure in said fuel feed line and in said air feed line; an instrument air pressure system for supplying said instrument means; means for venting said pressure system in response to at least one of said instrument means to shut down operation of said plant; means for closing said motor valve in response to bled-off of said air supply; and means for closing said motor valve in response to termination of rotation of said drum.

8. The plant of claim 7 including a pressure control system on said off-gas line comprising a motor valve therein; pressure sensing means sensitive to pressure in said off-gas line; a pressure controller responsive to said pressure sensing means; and means for opening said motor valve in response to said pressure controller when pressure in said off-line reaches a predetermined maximum pressure and closing same when said pressure is restored.

9. Apparatus comprising in combination a carbon black plant having air operated control instruments and an instrument air supply system therefor; a rotatable gas fired dryer having burner means therein; a fuel line connected with said burner means; a normally closed air operated motor valve in said fuel line; an air supply line connected with said motor valve; an air operated three-way valve in said air supply line open to flow thru said air supply line when air actuated and open to vent from the downstream side of said supply line when actuating air is not applied, said three-way valve being operatively connected with said instrument air supply system so that pressure failure in said supply system operates said three-way valve to open same to vent and bleed off pressure from said air line to allow said motor valve to close, thereby cutting off the fuel to said dryer.

10. Apparatus comprising in combination a rotatable gas fired dryer having burner means therein; a fuel line connected with said burner means; a normally closed air operated motor valve in said fuel line; and air supply line connected with said motor valve; a solenoid operated three-way valve in said air supply line open to flow thru said air line when the solenoid is energized and open to vent from the downstream side when not energized; a stack leading from said dryer having temperature sensing means therein; and electrical relay means responsive to said temperature sensing means in control of said solenoid operated valve.

11. Apparatus comprising in combination a rotatable gas fired dryer having burner means therein; a fuel line connected with said burner means; a normally closed air operated motor valve in said fuel line; an air supply line connected with said motor valve; a solenoid operated three-way valve in said air supply line open to flow thru said air line when the solenoid is energized and open to vent from the downstream side when not energized; a conveyor communicating with the solids outlet of said dryer; an electric motor operatively connected with said conveyor; and relay means in circuit with said solenoid and actuated by the circuit of said motor so as to de-energize said solenoid when said motor stops, thereby opening said three-way valve to vent to bleed off pressure on said motor valve and allow same to cut off fuel to said burner means.

References Cited in the file of this patent

UNITED STATES PATENTS

| | | |
|---|---|---|
| 1,504,991 | Stern | Aug. 12, 1924 |
| 2,604,313 | Grantham | July 22, 1952 |
| 2,952,921 | Wood et al. | Sept. 20, 1960 |
| 2,973,249 | Haas | Feb. 28, 1961 |